United States Patent
Kamisuwa et al.

(10) Patent No.: US 8,797,585 B2
(45) Date of Patent: Aug. 5, 2014

(54) IMAGE PROCESSING SYSTEM, INFORMATION PROVIDING APPARATUS, AND INFORMATION PROVIDING METHOD FOR SIMULTANEOUSLY DISPLAYING ENVIRONMENTAL BURDEN REDUCTIONS IN AN IMAGE FORMING APPARATUS AND AN ERASING APPARATUS

(75) Inventors: Yoshikatsu Kamisuwa, Tokyo (JP); Hiroyo Tanaka, Tokyo (JP); Tsunehiro Motegi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/529,060

(22) Filed: Jun. 21, 2012

(65) Prior Publication Data

US 2012/0327487 A1  Dec. 27, 2012

Related U.S. Application Data

(60) Provisional application No. 61/501,440, filed on Jun. 27, 2011, provisional application No. 61/501,447, filed on Jun. 27, 2011.

(51) Int. Cl.
*G06F 3/12* (2006.01)
*H04N 1/60* (2006.01)
*G03F 3/10* (2006.01)
*B41J 2/325* (2006.01)

(52) U.S. Cl.
USPC ............ 358/1.15; 358/527; 358/1.9; 347/179

(58) Field of Classification Search
USPC .......................... 358/1.15, 527, 1.9; 347/179
See application file for complete search history.

(56) References Cited

U.S. PATENT DOCUMENTS

| | | | | |
|---|---|---|---|---|
| 5,394,231 A * | 2/1995 | Sudo et al. | ..................... | 399/228 |
| 5,400,123 A * | 3/1995 | Sato et al. | ..................... | 399/187 |
| 5,897,726 A * | 4/1999 | Shinkai et al. | .................. | 156/94 |
| 6,017,386 A * | 1/2000 | Sano et al. | .................. | 106/31.32 |
| 7,856,202 B2 * | 12/2010 | Mizobuchi et al. | ........... | 399/389 |
| 2005/0231758 A1 * | 10/2005 | Reynolds | ..................... | 358/1.15 |
| 2006/0082836 A1 * | 4/2006 | Mimura | ....................... | 358/448 |
| 2008/0008508 A1 * | 1/2008 | Mizobuchi et al. | ........... | 399/389 |
| 2008/0037058 A1 | 2/2008 | Ban | | |
| 2009/0154970 A1 * | 6/2009 | Yoshida et al. | ............... | 399/341 |

(Continued)

FOREIGN PATENT DOCUMENTS

JP  2006-021414  1/2006

*Primary Examiner* — Houshang Safaipour
*Assistant Examiner* — Walter Yehl
(74) *Attorney, Agent, or Firm* — Amin, Turocy & Watson, LLP

(57) ABSTRACT

A system in an embodiment includes an image forming apparatus, an erasing apparatus, a first apparatus, and a display unit. The image forming apparatus forms an image on a sheet using a decolorable color material. The erasing apparatus decolorizes an image. The first apparatus computes, from a reduction in the number of sheets achieved by a setting for image formation in the image forming apparatus, the amount of a reduction in environmental burdens achieved by use of the image forming apparatus and computes, from the number of sheets erased by the erasing apparatus, the amount of a reduction in environmental burdens achieved by use of the erasing apparatus. The display unit simultaneously displays the amount of the reduction in environmental burdens achieved by the image forming apparatus and the amount of the reduction in environmental burdens achieved by the erasing apparatus.

20 Claims, 15 Drawing Sheets

(56) References Cited

U.S. PATENT DOCUMENTS

| | | | |
|---|---|---|---|
| 2009/0314837 A1* | 12/2009 | Kataoka et al. | 235/385 |
| 2010/0120338 A1* | 5/2010 | Ono | 451/65 |
| 2010/0161363 A1* | 6/2010 | Nakane et al. | 705/7 |
| 2010/0265546 A1* | 10/2010 | Mori et al. | 358/1.15 |
| 2010/0272449 A1* | 10/2010 | Yoshida et al. | 399/2 |
| 2011/0235075 A1* | 9/2011 | Iguchi et al. | 358/1.12 |
| 2011/0236843 A1* | 9/2011 | Iguchi et al. | 432/32 |
| 2011/0273739 A1* | 11/2011 | Grasso et al. | 358/1.15 |
| 2012/0053885 A1* | 3/2012 | Kato | 702/128 |
| 2012/0325101 A1* | 12/2012 | Tanaka et al. | 101/483 |
| 2013/0015623 A1* | 1/2013 | Iguchi et al. | 271/279 |

* cited by examiner

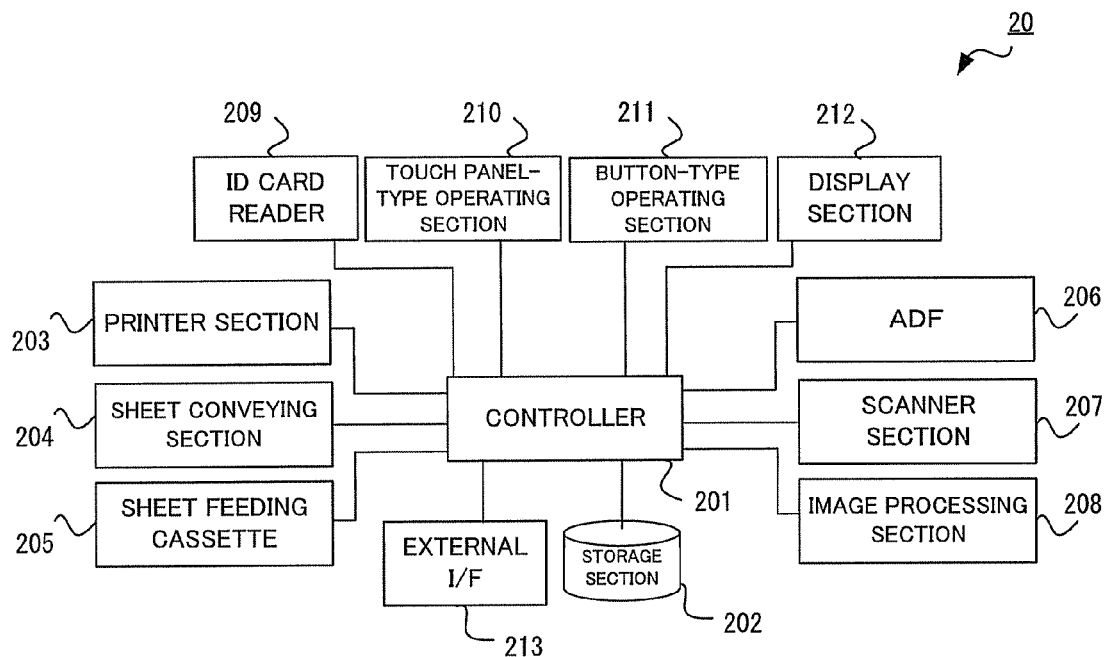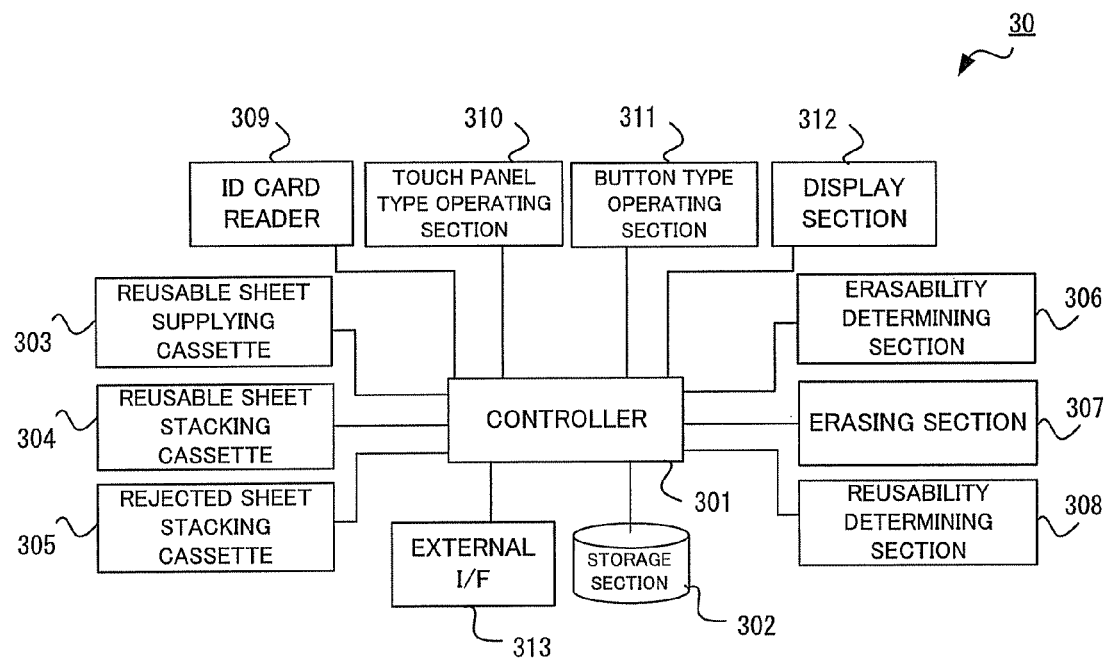

FIG. 4

| No. | SERIAL NUMBER | USER ID | START TIME AND DATE | FINISH TIME AND DATE | FUNCTION | COLOR | SIZE | DUPLEX SETTING | PAGE AGGREGATION SETTING | NUMBER OF INPUT PAGES | NUMBER OF PRINTED SHEETS | NUMBER OF PRINTED PAGES |
|---|---|---|---|---|---|---|---|---|---|---|---|---|
| 1 | AAA1234 | 12345 | 2011/4/1 09:05 | 2011/4/1 09:06 | Print | Full color | A4 | Simplex | 1 | — | 1 | 1 |
| 2 | AAA1234 | 32158 | 2011/4/1 09:10 | 2011/4/1 09:12 | Copy | Black | A4 | Simplex | 1 | 3 | 3 | 3 |
| 3 | AAA1234 | 25871 | 2011/4/1 09:55 | 2011/4/1 09:56 | Scan | Full color | — | — | — | 5 | — | — |
| 4 | AAA1234 | 56954 | 2011/4/1 10:02 | 2011/4/1 10:08 | Print | Full color | A4 | Duplex | 1 | — | 6 | 9 |
| 5 | AAA1234 | 15236 | 2011/4/1 10:10 | 2011/4/1 10:13 | Print | Full color | A4 | Simplex | 1 | — | 5 | 5 |
| 6 | AAA1234 | 53548 | 2011/4/1 10:35 | 2011/4/1 10:38 | Copy | Black | A4 | Duplex | 2 | 4 | 1 | 2 |

FIG.5A

TOTAL

| NUMBER OF OUTPUT PAGES | 80537 |
|---|---|
| COPY | 18392 |
| PRINT | 61472 |
| SCAN | 4170 |
| FAX RECEPTION | 667 |
| FAX TRANSMISSION | 236 |

FIG.5B

COLOR

| | COLOR | BLACK | TWO COLORS |
|---|---|---|---|
| PRINTING | 7087 | 73439 | 11 |
| COPY | 575 | 17817 | 0 |
| PRINT | 6512 | 54949 | 11 |
| SCAN | 2283 | 1887 | 0 |

FIG.5C

DUPLEX SETTING

| | SIMPLEX | DUPLEX |
|---|---|---|
| PRINTING | 41160 | 19731 |
| COPY | 12376 | 2992 |
| PRINT | 28111 | 16739 |

FIG.5D

PAGE AGGREGATION SETTING

| | NO PAGE AGGREGATION | 2 in 1 | 4 in 1 | 6 in 1 | 8 in 1 | 9 in 1 | 16 in 1 | OTHER |
|---|---|---|---|---|---|---|---|---|
| PRINTING | 59112 | 19248 | 1672 | 57 | 31 | 395 | 22 | 0 |
| COPY | 18383 | 9 | 0 | 0 | 0 | 0 | 0 | 0 |
| PRINT | 40056 | 19239 | 1672 | 57 | 31 | 395 | 22 | 0 |

FIG. 6

| No. | SERIAL No. | USER ID | START TIME | FINISH TIME | SIZE | NUMBER OF INPUTTED SHEETS | NUMBER OF REUSABLE SHEETS | NUMBER OF INCOMPLETELY ERASED SHEETS | NUMBER OF FOLDED/BROKEN SHEETS | NUMBER OF SOILED SHEETS | NUMBER OF OTHER SHEETS |
|---|---|---|---|---|---|---|---|---|---|---|---|
| 1 | XXX1001 | 12345 | 2011/4/10 09:10 | 2011/4/10 09:10 | A4 | 2 | 1 | 1 | 0 | 0 | 0 |
| 2 | XXX1001 | 32158 | 2011/4/21 09:15 | 2011/4/21 09:15 | A4 | 1 | 1 | 0 | 0 | 0 | 0 |
| 3 | XXX1001 | 25871 | 2011/4/22 15:55 | 2011/4/22 15:58 | A4 | 21 | 21 | 0 | 0 | 0 | 0 |
| 4 | XXX1001 | 56954 | 2011/4/25 13:01 | 2011/4/25 13:08 | A4 | 62 | 57 | 3 | 2 | 0 | 0 |
| 5 | XXX1001 | 15236 | 2011/4/25 13:22 | 2011/4/25 13:30 | A4 | 53 | 51 | 2 | 0 | 0 | 0 |
| 6 | XXX1001 | 53548 | 2011/5/12 08:05 | 2011/5/12 08:12 | A4 | 40 | 40 | 0 | 0 | 0 | 0 |

FIG. 7

| SERIAL NO. | START TIME | SIZE | NUMBER OF INPUTTED SHEETS | NUMBER OF REUSABLE SHEETS | NUMBER OF INCOMPLETELY ERASED SHEETS | NUMBER OF FOLDED/ BROKEN SHEETS | NUMBER OF SOILED SHEETS | NUMBER OF OTHER SHEETS |
|---|---|---|---|---|---|---|---|---|
| XXX1001 | 2011/4/10 9:10 | A4 | 3290 | 3053 | 161 | 52 | 24 | 0 |

FIG. 8

| USER ID | YEAR | MONTH | RANK | TOTAL AMOUNT OF CO2 REDUCTION | ECO-MFP ||||| ERASING APPARATUS |||
|---|---|---|---|---|---|---|---|---|---|---|---|---|
| | | | | | AMOUNT OF CO2 REDUCTION | NUMBER OF PRINTED PAGES | SHEET REDUCTION RATIO | REDUCTION RATIO BY DUPLEX | REDUCTION RATIO BY PAGE AGGREGATION | ... | AMOUNT OF CO2 REDUCTION | NUMBER OF REUSABLE SHEETS | REUSE RATIO | ... |
| 12345 | 2011 | 4 | 15 | 733 | 550 | 126 | 45 | 15 | 35 | | 183 | 30 | 100 | |
| 32158 | 2011 | 4 | 14 | 784 | 455 | 96 | 46 | 8 | 41 | | 329 | 54 | 93 | |
| 25871 | 2011 | 4 | 6 | 3601 | 2747 | 262 | 71 | 34 | 56 | | 854 | 140 | 93 | |
| 56954 | 2011 | 4 | 40 | 0 | 0 | 2 | 0 | 0 | 0 | | 0 | 0 | 0 | |
| 15236 | 2011 | 4 | 2 | 4695 | 3066 | 270 | 74 | 35 | 60 | | 1629 | 267 | 99 | |
| 53548 | 2011 | 4 | 17 | 939 | 24 | 216 | 2 | 2 | 0 | | 915 | 150 | 81 | |

FIG. 9

| SHEET SIZE | A4 CONVERSION COEFFICIENT |
|---|---|
| A3 | 2 |
| A4 | 1 |
| A5 | 0.5 |
| B4 | 1.5 |
| B5 | 0.75 |
| LEDGER | 1.9 |
| LETTER | 1 |
| LEGAL | 1.2 |

FIG. 15A
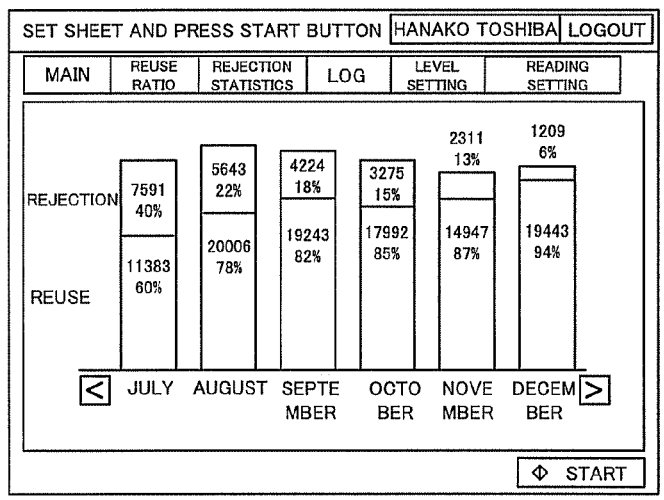
FIG. 15B
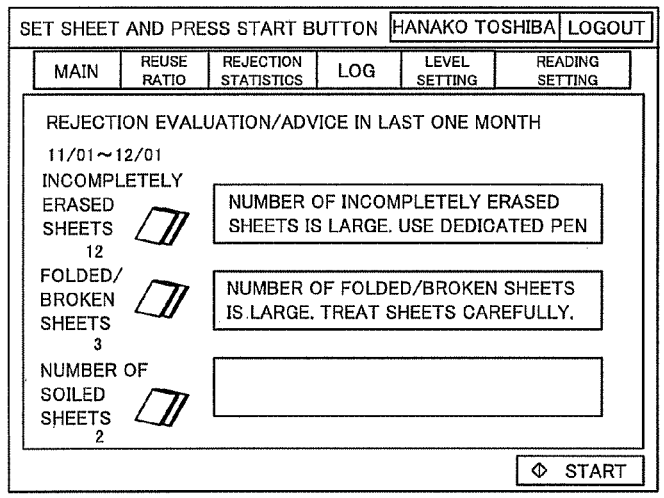
FIG. 15C
| DATE AND TIME | REFERENCE NUMBER OF SHEETS | NUMBER OF REUSABLE SHEETS | NUMBER OF REJECTED SHEETS | REUSE RATIO | AMOUNT OF REDUCTION IN CO2 |
|---|---|---|---|---|---|
| 2010/12/02 09:00 | 45 | 40 | 8 | 83% | 272.0g |
| 2010/12/06 09:13 | 98 | 79 | 19 | 88% | 237.2g |
| 2010/12/07 10:52 | 55 | 43 | 32 | 72% | 292.4g |
| 2010/12/10 09:16 | 196 | 160 | 36 | 86% | 1088.0g | ical burdens is not presented to users.

IMAGE PROCESSING SYSTEM, INFORMATION PROVIDING APPARATUS, AND INFORMATION PROVIDING METHOD FOR SIMULTANEOUSLY DISPLAYING ENVIRONMENTAL BURDEN REDUCTIONS IN AN IMAGE FORMING APPARATUS AND AN ERASING APPARATUS

CROSS-REFERENCE TO RELATED APPLICATIONS

This application is based upon and claims the benefit of priority from: US provisional application 61/501440, filed on Jun. 27, 2011; US provisional application 61/501447, filed on Jun. 27, 2011; the entire contents all of which are incorporated herein by reference.

FIELD

Embodiments described herein relate generally to an image processing system including an image forming apparatus that forms an image with a decolorable toner and an erasing apparatus that erases the toner on a sheet.

BACKGROUND

Erasing apparatuses that erase images on sheets by heat treatment have been known.

There is a system that displays the degree of a reduction in environmental burdens achieved through the setting for duplex/simplex printing and the setting of a page aggregation function for printing a plurality of pages on one side of a sheet (this function is hereinafter referred to as Nin1, as needed).

In the conventional display method, a reduction achieved in consideration of reuse using an erasing apparatus is not presented. Therefore, an appropriate reduction in environmental burdens is not presented to users.

DESCRIPTION OF THE DRAWINGS

FIG. 1 is a block diagram illustrating an exemplary configuration of an image forming apparatus.

FIG. 2 is a block diagram illustrating an exemplary configuration of an erasing apparatus.

FIG. 4 is a diagram showing an operation log outputted from the image forming apparatus.

FIG. 5A is a diagram showing examples of the usage counts of the functions of the image forming apparatus.

FIG. 5B is a diagram showing examples of the usage counts of functions in color, black, and two colors in the image forming apparatus.

FIG. 5C is a diagram showing examples of the usage counts of functions for each of duplex and simplex print settings in the image forming apparatus.

FIG. 5D is a diagram showing examples of the usage counts of functions for each of different page aggregation settings in the image forming apparatus.

FIG. 6 is a diagram showing an exemplary operation log outputted from the erasing apparatus.

FIG. 7 is a diagram showing an example of the usage statistics of the erasing apparatus.

FIG. 8 is a diagram showing an example of the usage statistics stored an analysis server.

FIG. 9 is a diagram showing examples of conversion coefficients for different sheet sizes.

FIG. 15A illustrates an example of the display of monthly statistics on rejection and reuse.

FIG. 15B is a diagram illustrating an example of the display of advice and the details of rejection.

FIG. 15C is a diagram illustrating an example of the display of operating statistics.

DETAILED DESCRIPTION

Figure 3:
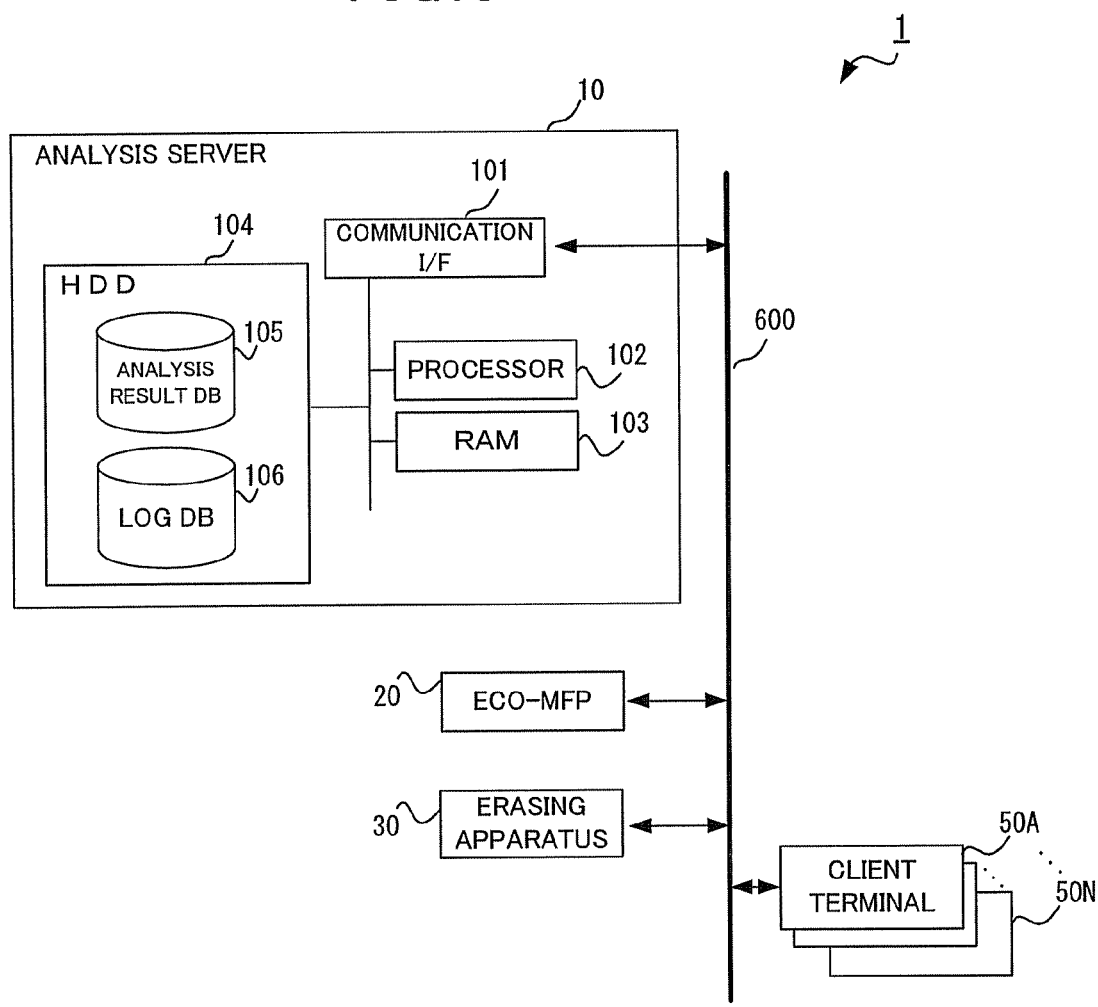
FIG. 3 is a diagram illustrating an exemplary configuration of an image processing system in a first embodiment.

An image processing system in an embodiment includes an image forming apparatus, an erasing apparatus, a first apparatus, and a display unit. The image forming apparatus forms an image on a sheet using a color material that is decolorable by heating. The erasing apparatus decolorizes and erases an image on a sheet outputted from the image forming apparatus by heating. The first apparatus computes, from a reduction in the number of sheets that has been achieved by a setting for image formation in the image forming apparatus, an amount of a reduction in environmental burdens that has been achieved by use of the image forming apparatus and also computes, from the number of sheets erased using the erasing apparatus, an amount of a reduction in environmental burdens that has been achieved by use of the erasing apparatus. The display unit simultaneously displays the amount of the reduction in environmental burdens that has been achieved by the image forming apparatus and the amount of the reduction in environmental burdens that has been achieved by the erasing apparatus, these amounts having been computed by the first apparatus.

An information providing apparatus in an embodiment includes a storage section, a communication section, and a controller. The storage section stores display layout data. The communication section receives first information containing information about a setting for image formation performed by an image forming apparatus that forms an image on a sheet using a color material decolorable by heating and further receives second information containing information about the number of sheets erased by an erasing apparatus that decolorizes and erases, by heating, an image on a sheet outputted from the image forming apparatus. The controller computes, from a reduction in the number of sheets that is derived from the information that is included in the first information and relates to the setting for image formation, the amount of a reduction in environmental burdens that has been achieved by use of the image forming apparatus. The controller also computes, from the information that is included in the second information and relates to the number of sheets erased, the amount of a reduction in environmental burdens that has been achieved by use of the erasing apparatus. The controller generates display data by placing, in the layout data stored in the storage section, the computed amount of the reduction in environmental burdens that has been achieved by the erasing apparatus and the computed amount of the reduction in environmental burdens that has been achieved by the image forming apparatus such that the values of these computed amounts of the reductions in environmental burdens are displayed simultaneously.

In each of the following embodiments, a description will be given of a system that displays the amount of a reduction in environmental burdens that has been achieved by a print setting of an image forming apparatus and the amount of a reduction in environmental burdens that has been achieved by erasing toner using an erasing apparatus simultaneously on one screen and also displays the sum of these amounts of the reductions in environmental burdens. In the systems described in the following embodiments, the amount of a reduction in $CO_2$ emission is displayed as an example of the amount of a reduction in environmental burdens.

First Embodiment

FIG. 1 is a block diagram illustrating the configuration of an image forming apparatus. The image forming apparatus 20 is an MFP (Multifunction Peripheral) that can perform copying, printing, document scanning, and FAX transmission/reception and forms an image on a sheet using decolorable toner (a color erasable toner, a decolorable color material). The toner used is decolorized when heat of a temperature higher than that of the heat during image formation is applied to the toner. In the following description, the image forming apparatus 20 is referred to as an ECO-MFP 20.

The ECO-MFP 20 includes: a controller 201, or a processor, that controls hardware in the apparatus in a centralized manner and executes programs; and a storage section 202 that stores programs, various parameter values, data of an image to be processed, and the like. The controller 201 is, for example, a CPU (Central Processing Unit) or an MPU (Micro Processing Unit), and the storage section 202 is composed of a main storage section being a volatile storage section and an auxiliary storage section being a non-volatile storage section. Part of the control by the ECO-MFP 20 is implemented by execution of a program stored in the storage section 202 by the controller 201.

A sheet feeding cassette 205 stores sheets (paper mediums) and is configured to include paper feed rollers that supply sheets to a sheet conveying section 204 and a casing for storing the sheets. The sheet conveying section 204 includes a plurality of pairs of rollers and a conveying belt and conveys sheets supplied from the sheet feeding cassette 205 to a printer section 203.

An ADF 206 is an auto document feeder and conveys documents placed on a tray one by one to a transparent glass board of a scanner section 207. The scanner section 207 is a device configured to read the image of a conveyed document and irradiates the document on the transparent glass board with visible light so that the image of the reflected light is formed on a CCD (Charge Coupled Device) image sensor via a plurality of mirrors to thereby convert the data of the paper medium to electronic data. The obtained electronic data (image data) is stored in the storage section 202.

An external I/F 213 (I/F: Interface) includes a LAN (Local Area Network) board and controls data transmission from/to an external device. According to the control by the controller 201, the external I/F 213 receives, for example, data of an image to be printed, receives an analysis report (display data) about the amount of a reduction in environmental burdens described later, and transmits the operation log of the ECO-MFP 20, data of its usage statistics, etc. to an external device.

An image processing section 208 acquires the data of an image to be printed that has been stored in the storage section 202, determines whether the image data is a text-based image or an image such as a photograph, and performs a region determination. The image processing section 208 performs image processing such as halftone processing on the acquired image data. The image processing section 208 is assumed to be a board dedicated to image processing (such as an ASIC (Application Specific Integrated Circuit)) but may be a hardware resource of the controller 201.

The printer section 203 is a unit configured to form an image processed by the image processing section 208 on a sheet conveyed by the sheet conveying section 204. The printer section 203 transfers an erasable toner contained in a drum onto a sheet and applies heat of a prescribed temperature to the toner to form an image. The sheet having the image formed thereon is outputted to a discharge tray (not shown).

An ID card reader 209 (ID: identification) is an IC reader (IC: integrated circuit) used to read an ID card carried by a user. The ID card may be read in a contact manner or a noncontact manner. An authentication unit installed in the ECO-MFP 20 or an authentication unit provided in an external device performs authentication processing in which a value read from the ID card is compared with a preregistered value. If the result of the authentication is affirmative, the user can operate the ECO-MFP 20. When the authentication processing is performed in the ECO-MFP 20, the authentication unit is composed of the ID card reader 209, the controller 201, and an authentication program stored in the storage section 202 in advance.

A touch panel-type operating section 210 and a button-type operating section 211 are input devices that acquire the number of sheets to be printed, print settings, and the like from the user. The touch panel-type operating section 210 includes a touch panel disposed on a display unit (a display section 212 described later) and detects the pressure of a finger tip of the user or a pen by a resistive film scheme, an infrared scheme, and the like to acquire a detection position (coordinate information). The button-type operating section 211 includes physical buttons such as a numeric keypad and a start button and detects the pressing of a button.

The display section 212 is a device configured to display to the user the progress status of processing, the status of the apparatus, the history of use, and the like and displays objects for operation such as button images for the touch panel-type operating section 210 and objects for display. The display section 212 displays the statistics of use of sheets, the statistics of reusable sheets, and the amount of a reduction in $CO_2$ emission.

FIG. 2 is a block diagram illustrating an exemplary configuration of an erasing apparatus. The erasing apparatus 30 heats a sheet to make the erasable toner formed on the sheet printed by the ECO-MFP 20 colorless. The erasing apparatus 30 includes: a controller 301 including a processor; a storage section 302 including a volatile storage device and a non-volatile storage device; and an external I/F 313 including a LAN board. The erasing apparatus 30 further includes an ID card reader 309, a touch panel-type operating section 310, a button-type operating section 311, and a display section 312. These sections have the same functions as those of the corresponding sections in the ECO-MFP 20.

A reusable sheet supplying cassette 303 is a cassette for placing sheets to be reused, i.e., sheets printed with an erasable toner by the ECO-MFP 20. A reusable sheet stacking cassette 304 is a cassette for stacking sheets with the toner erased (made colorless) by an erasing section 307 and determined to be reusable. A rejected sheet stacking cassette 305 is a cassette for stacking sheets determined to be not suitable for reuse such as incompletely erased sheets, folded/broken sheets, and punched sheets.

The erasing section 307 heats the sheets placed on the reusable sheet supplying cassette 303 at a temperature at which the erasable toner becomes colorless. An erasability determining section 306 determines whether or not the toner on a sheet processed by the erasing section 307 is colorless. For example, the erasability determining section 306 scans the sheet processed by the erasing section 307 using a line sensor or a CCD image sensor, generates the image data of the sheet, and compares each pixel value of the image data with a prescribed threshold value (a threshold value that can be set by the user), thereby determining whether or not the toner on the sheet is colorless.

A reusability determining section 308 is a unit configured to determine whether or not a sheet is reusable, and determines the broken and damaged condition of the sheet, and also determines whether or not the sheet is usable on the basis of the determination result from the erasability determining section 306. When the determination result from the reusability determining section 308 is affirmative, the sheet is conveyed to the reusable sheet stacking cassette 304. When the determination result is negative, the sheet is conveyed to the rejected sheet stacking cassette 305. The reusability determining section 308 outputs the log of the number of sheets determined to be reusable to the storage section 302 and also outputs the log of the numbers of non-reusable sheets for different causes of non-reusability to the storage section 302.

FIG. 3 is a diagram illustrating an exemplary configuration of an image processing system in the first embodiment. The image processing system 1 includes an analysis server 10 (a first apparatus, an information providing apparatus), an ECO-MFP 20, an erasing apparatus 30, and a plurality of client terminals 50A to 50N, and these are connected via a LAN 600.

The ECO-MFP 20 stores job information about printing and copying performed in the storage section 202 as an operation log. FIG. 4 shows an example of the operation log of the ECO-MFP 20. The ECO-MFP 20 records, in one record, its serial number, the ID of a user who has submitted a job, the date and time of the start of the processing, the date and time of the end of the processing, a function used (for example, printing or copying), color type (full color, black, or two colors), and sheet size. The ECO-MFP 20 also records, in the record, information including a setting for duplex/simplex printing, a setting for page aggregation, the number of inputted pages during copying, the number of sheets actually outputted, the number of printed pages, and the like.

A reduction in the number of sheets and a reduction in the number of pages can be computed from the values of the setting for duplex/simplex printing and the setting for page aggregation. For example, in No. 2 in the operation log, the setting for duplex/simplex printing is Simplex (one-sided), and the setting for page aggregation is 1 (no page aggregation). Therefore, no reductions are achieved. More specifically, the number of inputted pages is 3, the number of outputted pages and also the number of printed pages are 3. In No. 6, the setting for duplexing is Duplex (double-sided), and the setting for page aggregation is 2 (two pages reduced in size are printed on one sheet (2 in 1)). Therefore, although the number of inputted pages is 4, the number of printed sheets is 1 (a reduction of 3 sheets), and the number of printed pages is 2 (a reduction of 2 pages).

The ECO-MFP 20 compiles the data of executed jobs to obtain a cumulative sum for each of the types of processing. FIGS. 5A to 5D show examples of the compiled counter information. The ECO-MFP 20 computes the cumulative sum of output pages for each of the functions of copying, printing, scanning, FAX transmission, and FAX reception (FIG. 5A), also computes, for each function, the cumulative sums of pages outputted in color, black, and two colors (FIG. 5B), the cumulative sums of pages printed duplex and simplex (FIG. 5C), and the cumulative sums of pages printed in different page aggregation modes (FIG. 5D), and stores the computed results in the storage section 202.

The erasing apparatus 30 stores job information and processing results when erasing operation is performed in the storage section 302 as an operation log. FIG. 6 is a diagram showing an example of the operation log of the erasing apparatus 30. The erasing apparatus 30 stores, in one record, its serial number, the ID of a user, a start date and time, a finish date and time, and sheet size. The erasing apparatus 30 also stores, in the record, the number of sheets processed (the input number of sheets), and the number of successfully erased sheets (the number of reusable sheets), and records the numbers of non-erasable sheets for different causes of non-erasability. The causes of non-erasability include non-erasable objects, folded/broken sheets, soiled sheets, and other sheets. The reusability determining section 308 of the erasing apparatus 30 stores the numbers of non-erasable sheets in the storage section 302.

The erasing apparatus 30 compiles the data of the numbers of sheets shown in FIG. 6 and stores the cumulative sums. FIG. 7 is an example of the compiled counter information. The reusability determining section 308 of the erasing apparatus 30 stores, in the storage section 302, the cumulative sum of the number of inputted pages, the cumulative sum of the number of reusable sheets, and the cumulative sums of the numbers of non-erasable sheets counted for different causes. The numbers of non-reusable sheets include the number of incompletely erased sheets, the number of folded/broken sheets, the number of soiled sheets, and the number of other sheets, as in those in the output of the operation log.

The analysis server 10 collects the operation log and counter information of the ECO-MFP 20 and the operation log and counter information of the erasing apparatus 30 and computes information about the amount of a reduction in environmental burdens. In addition, the analysis server 10 generates a screen layout used to present the amount of a reduction in environmental burdens to a user. The screen layout will be described later. The analysis server 10 is a computer including a communication I/F 101 (communication section) that controls communications with the outside via the LAN 600, a processor 102 (controller) used as an arithmetic processing unit, a RAM 103 (Random Access Memory) used as a main storage unit, and an HDD 104 (a Hard disk drive, a storage unit) used as an auxiliary storage unit, as shown in FIG. 3. Each of the functions of the analysis server 10 described later is implemented by loading a program stored in the HDD 104 in advance to the RAM 103 and causing the processor 102 to execute the program with cooperation of hardware resources.

The communication I/F 101 receives the operation logs and counter information of the ECO-MFP 20 and the erasing apparatus 30 when the analysis server 10 sends a request to the ECO-MFP 20 and the erasing apparatus 30 at regular intervals (for example, 10 minute intervals) or when the ECO-MFP 20 and the erasing apparatus 30 send their operation logs and counter information to the analysis server 10 at regular intervals. The received data is stored in a log DB 106 in the HDD 104. Alternatively, the communication I/F 101 receives the operation log and counter information of the ECO-MFP 20 or the erasing apparatus 30 when the ECO-MFP 20 or the erasing apparatus 30 sends the operation log and counter information upon occurrence of a job. The received data is stored in the log DB 106. The processor 102 of the analysis server 10 executes environmental burden reduction amount analysis processing at the timing at which the data in the log DB 106 is updated, at preset time (for example, at 0 o'clock), or at preset time intervals (for example, 10 minute intervals) and stores the results in an analysis result DB 105. FIG. 8 shows an example of the date stored in the analysis result DB 105. The analysis server 10 complies the data in the log DB 106 for each user on monthly basis and computes the amount of a reduction in environmental burdens for each user as shown in FIG. 8. The analysis server 10 computes the amount of a reduction in $CO_2$ emission for each of the ECO-MFP 20 and the erasing apparatus 30 and then computes the sum of these amounts (the total $CO_2$ reduction amount). The analysis server 10 computes at least a sheet reduction ratio, a reduction ratio by duplexing, and a reduction ratio by page aggregation in the ECO-MFP 20 and also computes a reuse ratio in the erasing apparatus 30.

The analysis server 10 ranks the users such that the user with the highest total score (described later) is ranked first and the user with the second highest score is ranked second (see a "rank" column in FIG. 8).

The methods of computing the respective values will next be described. The processor 102 of the analysis server 10 performs the following computations for each user and each apparatus on monthly basis to compute cumulative sums. However, the following computations may be performed on different basis such as on daily basis and for each group in a company to compute the cumulative sums. The following computation methods are examples only.

First, the methods of computing respective values for the ECO-MFP 20 will be described. The processor 102 firsts computes the numbers of printed sheets in terms of the number of A4 size sheets. FIG. 9 shows an example of an A4 conversion table. The processor 102 acquires sheet sizes and the numbers of printed sheets (x1) from the operation log of the ECO-MFP 20 and acquires A4 conversion coefficients ($A_{size}$) from the conversion table stored in the HDD 104 in advance and shown in FIG. 9. The number of printed sheets (y1) is the sum of the products of the number of printed sheets (x1) in one job and the corresponding A4 conversion coefficient ($A_{size}$) (see equation 1).

$$y1 = \Sigma(A_{size} \times x1) \quad \text{(equation 1)}$$

The computation of the reduction ratio by duplexing will next be described. The reduction ratio by duplexing is the ratio of a reduction in the number of sheets achieved by the setting for duplex/simplex printing. First, the processor 102 computes the number of pages in terms of A4 size. As in the computation of the number of printed sheets, the processor 102 acquires sheets sizes and the numbers of printed pages (x2) from the log information of the image forming apparatus and acquires A4 conversion coefficients ($A_{size}$). The number of printed pages (y2) is the sum of the products of the number of printed pages (x2) in one job and the corresponding A4 conversion coefficient ($A_{size}$) (see equation 2).

$$y2 = \Sigma(A_{size} \times x2) \quad \text{(equation 2)}$$

The reduction in the number of sheets achieved by duplexing ($z_{duplex}$) is the sum of the products of a value obtained by subtracting the number of printed sheets (x1) from the number of printed pages (x2) in one job and the corresponding A4 conversion coefficient ($A_{size}$) (see equation 3). The reduction ratio by duplexing ($r_{duplex}$) is a value obtained by dividing the reduction in the number of sheets achieved by duplexing ($z_{duplex}$) by the number of printed pages (y2) (see equation 4).

$$z_{duplex} = \Sigma(A_{size} \times (x2-x1)) \quad \text{(equation 3)}$$

$$r_{duplex} = z_{duplex}/y2 \quad \text{(equation 4)}$$

The computation of the reduction ratio by page aggregation will next be described. The reduction ratio by page aggregation is the ratio of a reduction in the number of sheets achieved by the setting for page aggregation. First, the numbers of documents in terms of A4 size are computed. In the present embodiment, the numbers of documents are computed on the basis of the setting for page aggregation. However, when the numbers of documents are previously known, the sum thereof may be used. The processor 102 acquires aggregation values ($a_{Nin1}$) from the setting for page aggregation in the operation log of the ECO-MFP 20. These values are 1 when no aggregation is performed and are 2 when 2in1 is performed (two pages are aggregated into one page). The analysis server 10 acquires A4 conversion coefficients ($A_{size}$) using sheet sizes and computes the number of documents (y3) as the sum of the products of the number of printed pages in one job (x2), the corresponding aggregation value ($a_{Nin1}$), and the corresponding A4 conversion coefficient ($A_{size}$) (see equation 5).

$$y3 = \Sigma(A_{size} \times a_{Nin1} \times x2) \quad \text{(equation 5)}$$

A reduction in the number of sheets achieved by page aggregation ($z_{Nin1}$) is the sum of values each obtained by subtracting the number of printed pages in one job (x2) from the number of documents in the one job and is given by equation 6.

$$z_{Nin1} = \Sigma(A_{size} \times (a_{Nin1}-1) \times x2) \quad \text{(equation 6)}$$

The reduction ratio by page aggregation ($r_{Nin1}$) is a value obtained by dividing the reduction in the number of sheets achieved by page aggregation ($z_{Nin1}$) by the number of documents (y3) (see equation 7).

$$r_{Nin1} = z_{Nin1}/y3 \quad \text{(equation 7)}$$

The sheet reduction ratio is the ratio of the reduction in the number of sheets achieved by the setting for duplex/simplex printing and the setting for page aggregation. The sheet reduction ratio ($r_{print}$) is a value obtained by dividing the sum of the reduction in the number of sheets achieved by the setting for duplex/simplex printing ($z_{duplex}$) and the reduction in the number of sheets achieved by page aggregation ($z_{Nin1}$) by the number of documents (y3).

$$r_{print} = (z_{duplex} + z_{Nin1})/y3 \quad \text{(equation 8)}$$

The amount of a reduction in $CO_2$ emission is the amount (g) of $CO_2$ reduced by cutting the number of sheets used. Let the amount of $CO_2$ emitted per sheet be $A_{CO2}$. Then the amount of a reduction in $CO_2$ emission ($C_{print}$) is a value obtained by multiplying $A_{CO2}$ by the sum of the reduction in the number of sheets achieved by the setting for duplex/simplex printing ($z_{duplex}$) and the reduction in the number of sheets achieved by page aggregation ($z_{Nin1}$), as shown in equation 9. For example, 6.0182 g is used as the amount of $CO_2$ emitted per sheet ($A_{CO2}$).

$$c_{print} = (z_{duplex} + z_{Nin1}) \times A_{CO2} \quad \text{(equation 9)}$$

The methods of computing respective values for the erasing apparatus 30 will next be described. The number of reusable sheets is a value obtained by converting the number of sheets successfully erased by the erasing apparatus 30 to the number of A4 size sheets. The erasing apparatus 30 acquires sheet sizes from the size column in its operation log and then acquires A4 conversion coefficients ($A_{size}$) from the conversion table shown in FIG. 9. Then the sum of the products of the number of reusable sheets in one job (x4) in the operation log and the corresponding A4 conversion coefficient ($A_{size}$) is the number of reusable sheets ($z_{reuse}$) (see equation 10).

$$z_{reuse} = \Sigma(A_{size} \times x4) \quad \text{(equation 10)}$$

The computation of the reuse ratio will be described. The reuse ratio ($r_{reuse}$) is the ratio of the number of reusable sheets to the number of printed sheets and is a value obtained by dividing the number of reusable sheets ($z_{reuse}$) by the number of printed sheets (y1) (see equation 11).

$$r_{reuse} = z_{reuse}/y1 \quad \text{(equation 11)}$$

The derivation of the reuse ratio ($r_{reuse}$) when the number of printed sheets (y1) is 0 will be described. In the present embodiment, when the number of printed sheets (y1) is 0 and the number of reusable sheets ($z_{reuse}$) is larger than 0, the reuse ratio ($r_{reuse}$) is set to 999%. Of course, the reuse ratio is not limited to 999% and may be any value other than 0 to 100. In the present embodiment, when the number of printed sheets (y1) is 0 and the number of reusable sheets ($z_{reuse}$) is 0, the reuse ratio ($r_{reuse}$) is set to 0%.

The amount of a reduction in $CO_2$ emission is the amount (g) of $CO_2$ reduced by the number of reusable sheets. Let the amount of $CO_2$ emitted per sheet be $A_{CO2}$ (for example, 6.0182 g as in the above case). Then the amount of a reduction in $CO_2$ emission ($c_{reuse}$) is a value obtained by multiplying $A_{CO2}$ by the number of reusable sheets ($r_{reuse}$) as shown in equation 12.

$$c_{reuse} = z_{reuse} \times A_{CO2} \quad \text{(equation 12)}$$

The rank of a user will next be described. The rank is derived on the basis of a total score ($s_{total}$) (the higher the total score, the higher the rank). The total score ($s_{total}$) is a value obtained by dividing the sum of the reduction in the number of sheets achieved by duplexing ($z_{duplex}$), the reduction in the number of sheets achieved by page aggregation ($z_{Nin1}$) and the number of reusable sheets ($z_{reuse}$) by the number of documents (y3) (see equation 13).

$$s_{total} = (z_{duplex} + z_{Nin1} + z_{reuse})/y3 \quad \text{(equation 13)}$$

A description will be given of the method of computing the total score ($s_{total}$) when the number of printed sheets (y1) is 0. In the present embodiment, when the number of printed sheets (y1) is 0 and the number of reusable sheets ($z_{reuse}$) is larger than 0, the number of reusable sheets ($z_{reuse}$) is substituted into the total score ($s_{total}$). In the present embodiment, when the number of printed sheets (y1) is 0 and the number of reusable sheets ($z_{reuse}$) is 0, the total score ($s_{total}$) is set to −1, and the rank of this user is out of the ranking.

The data on the amounts of reductions in environmental burdens compiled and computed as described above is displayed on the display section 212 and the display section 312 when a user uses the ECO-MFP 20 and the erasing apparatus 30.

Figure 10:
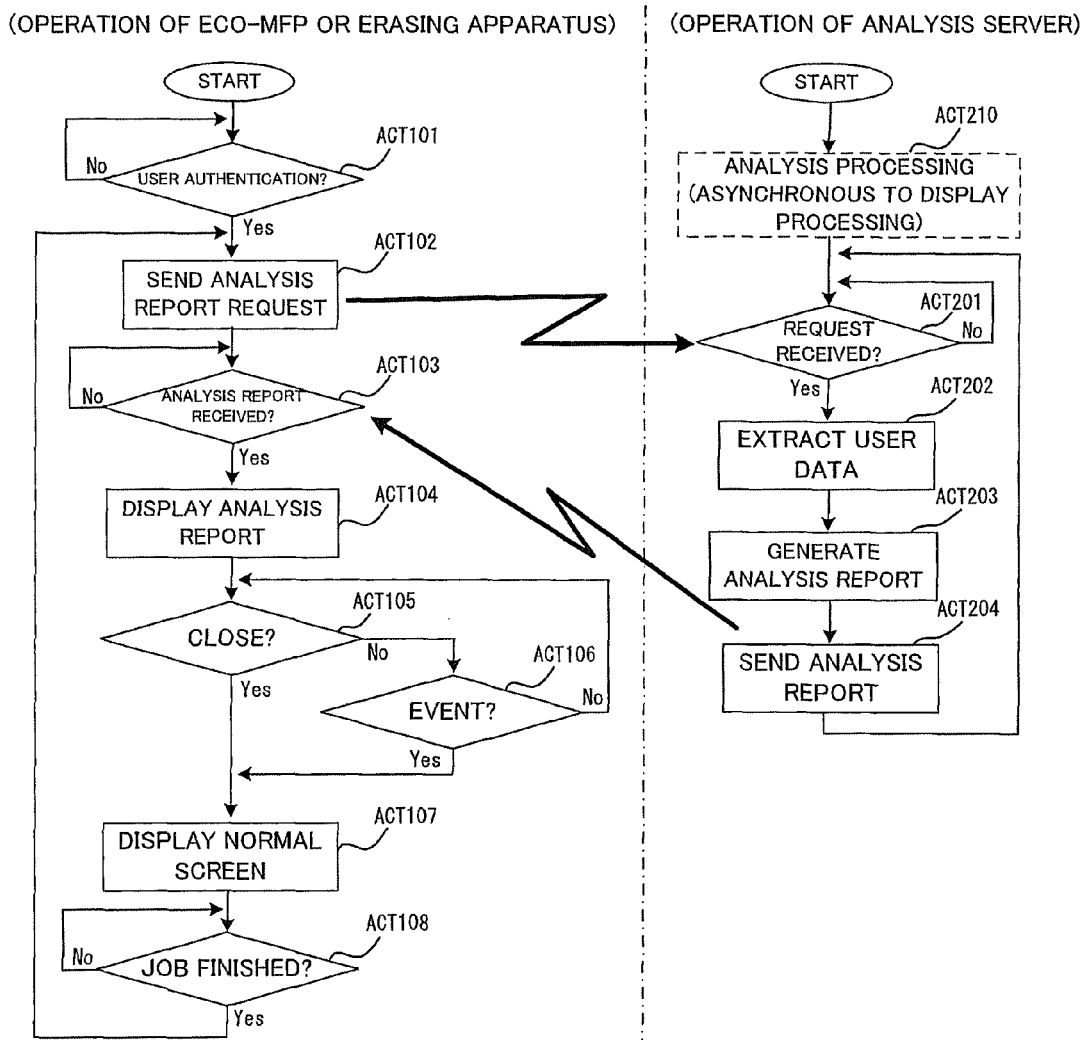
FIG. 10 is a diagram showing an example of the operation of the image processing system.

FIG. 10 is a flowchart showing an example of processing used to display an analysis report on the amount of a reduction in environmental burdens (hereinafter referred simply as an analysis report) when the user uses the ECO-MFP 20 or the erasing apparatus 30. In the description of FIG. 10, the user uses the ECO-MFP 20 but may use the erasing apparatus 30.

First, the ID card reader 209 reads a user ID from an ID card owned by the user to perform authentication (ACT101). In the first embodiment, the authentication is performed by checking whether or not the read ID matches ID information registered in the storage section 202 of the ECO-MFP 20 in advance. A method may be used in which the user ID and password of the user are inputted from the touch panel-type operating section 210 or the button-type operating section 211.

If the user authentication is affirmative (Yes in ACT101), the controller 201 transmits an electronic massage for requesting the user ID and an analysis report to the analysis server 10 via the external I/F 213 (ACT102) and waits until the data of the analysis report is received (ACT103, a loop indicated by "No").

The analysis server 10 performs the above-described analysis processing (computation processing) asynchronously to the processing for displaying the analysis report (ACT210).

If the electronic massage for requesting the analysis report is received from the ECO-MFP 20 (Yes in ACT201), the processor 102 acquires the data on the relevant user ID from the analysis result DB 105 (ACT202) and generates the analysis report (ACT203). The processor 102 places the computed respective values in their corresponding positions in display layout data (data in HTML format in the present embodiment) stored in the HDD 104 in advance. The processor 102 generates the analysis report containing the display layout data with the values placed therein and image and icon data stored in the HDD 104 in advance.

The communication I/F 101 of the analysis server 10 transmits the generated analysis report to the ECO-MFP 20, which is a requester (ACT204).

Upon reception of the analysis report (Yes in ACT103), the controller 201 of the ECO-MFP 20 controls the display section 212 to display the analysis report on the display section 212. The display section 212 displays the analysis report according to the control by the controller 201 (ACT104).

The analysis report remains displayed until a "close" button on the display section 212 (a "start" button for the erasing apparatus 30) is pressed or until an execution event for a function such as copying or printing occurs (No in ACT105 and a loop indicated by "No" in ACT106). When the "close" button is pressed (Yes in ACT105) or when an execution event occurs (Yes in ACT106), the display section 212 displays a normal menu screen according to the control of the controller 201 (ACT107). When an execution event has occurred, the process returns to ACT102 upon completion of the execution event (Yes in ACT108).

ACT210 is performed asynchronously in the above description but may be performed synchronously to the display processing. In this case, ACT210 is performed after reception of the request for the analysis report (after Yes in ACT201).

Figure 11:
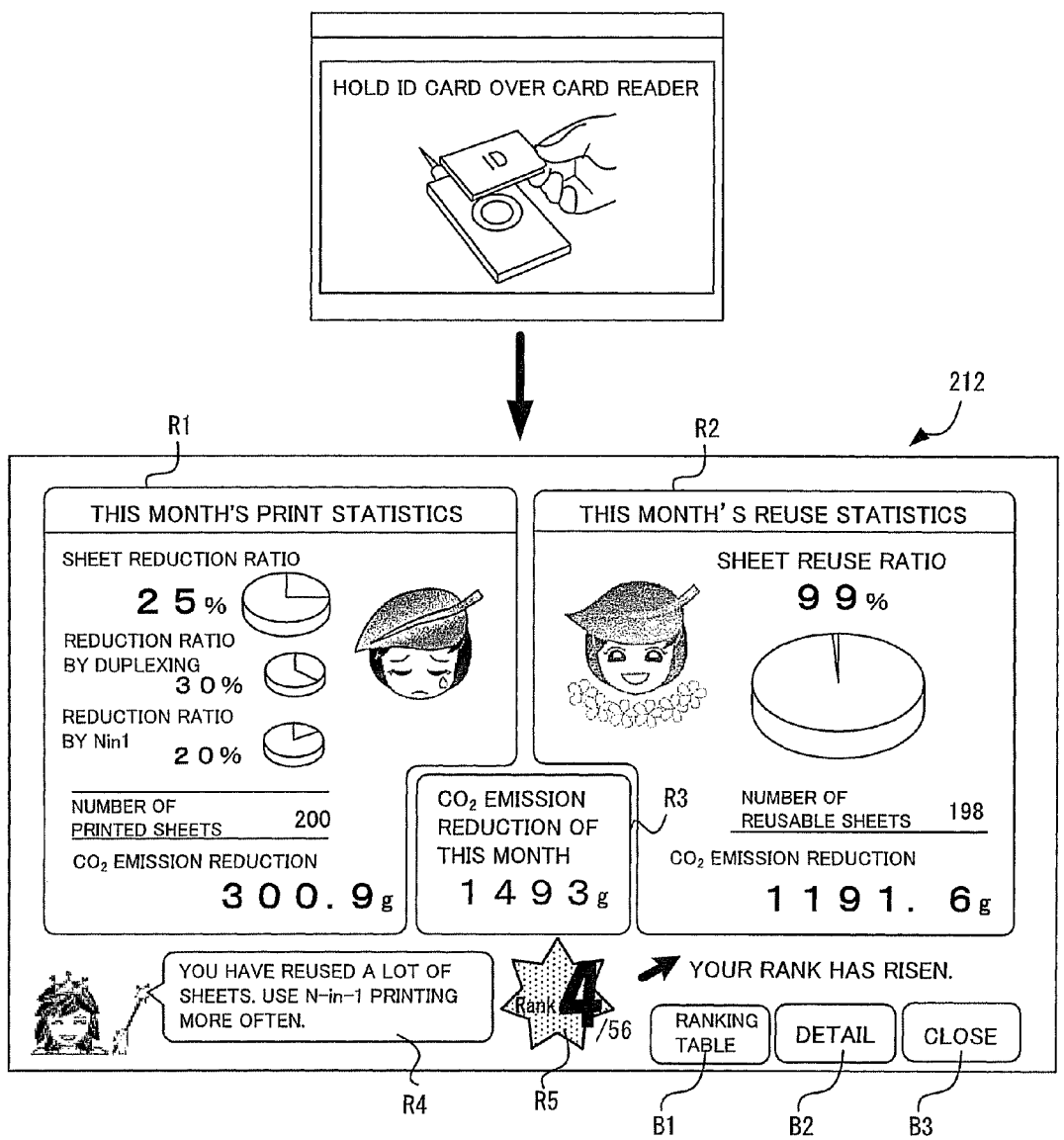
FIG. 11 is a diagram illustrating an example of a user authentication screen and an example of an analysis report displayed after user authentication.

FIG. 11 shows an example of a user authentication screen in the ECO-MFP 20 and an example of an analysis report display screen after user authentication. After the ECO-MFP 20 is powered on and initialized, the display section 212 displays an authentication screen shown in the upper part of FIG. 11. When the user brings an ID card close to the ID card reader 209 to complete authentication processing, the ECO-MFP 20 acquires an analysis report from the analysis server 10 according to the flowchart in FIG. 10, and the display section 212 displays the acquired analysis report (the lower part in FIG. 11). The display section 212 displays the respective values of the sheet reduction ratio, the reduction ratio by duplex printing, the reduction ratio by Nin1, the number of printed sheets, and the amount of a reduction in $CO_2$ emission in the ECO-MFP 20 in the current month on a left region R1 in FIG. 11. The display section 212 also displays pie charts for the respective reduction ratios.

In the present embodiment, the value of the amount of a reduction in $CO_2$ emission is categorized into three levels, and the image data of a character corresponding to a level is displayed. When the amount of a reduction in $CO_2$ emission exceeds a certain threshold value (a first threshold value herein), the image of a cheerful face is displayed. When the amount of a reduction in $CO_2$ emission is lower than a certain threshold value (a second threshold value herein) smaller than the first threshold value, the image of a lonely looking face is displayed. When the amount of a reduction in $CO_2$ emission is between the first threshold value and the second threshold value, the image of a normal looking face is displayed. The image displayed for the amount of a reduction in $CO_2$ emission is selected by the processor 102 of the analysis server 10, and analysis report data containing the selected image data is transmitted.

The display section 212 also displays the analysis report for the erasing apparatus 30 in a right region R2. The display section 212 displays the respective values of the sheet reuse ratio, the number of reusable sheets, and the amount of a reduction in $CO_2$ emission in the current month and also displays the pie chart of the sheet reuse ratio. As in the analysis report for the ECO-MFP 20 displayed on the left region R1, the value of the amount of a reduction in $CO_2$ emission is categorized into three levels, and the image data of a character corresponding to a level is displayed.

The display section 212 displays the sum (c) of the amount of a reduction in $CO_2$ emission ($c_{print}$) achieved by the ECO-MFP 20 and the amount of a reduction in $CO_2$ emission achieved by the erasing apparatus 30 in a region R3 near the center.

$$c = c_{print} + c_{reuse} \qquad \text{(equation 14)}$$

The processor 102 of the analysis server 10 computes the sum of these values, and the sum is placed in a prescribed position in the display layout and then transmitted.

For the purpose of continuous use of this system, the display section 212 displays advice on print settings and advice on reuse in a region R4. The display section 212 also displays the rank of the user in a region R5. The first to ninth ranks are displayed using large characters with star marks, and the tenth and lower ranks are displayed using normal size characters.

The display section 212 also displays information about a change in the rank. The change in the rank is computed by the processor 102 of the analysis server 10 by comparing the rank in the previous month and the rank in the current month and is displayed in three levels including "ranked up," "no change," and "ranked down." The change in the rank may be obtained by comparing the rank on the previous day and the rank on the day before the previous day.

Figure 12:
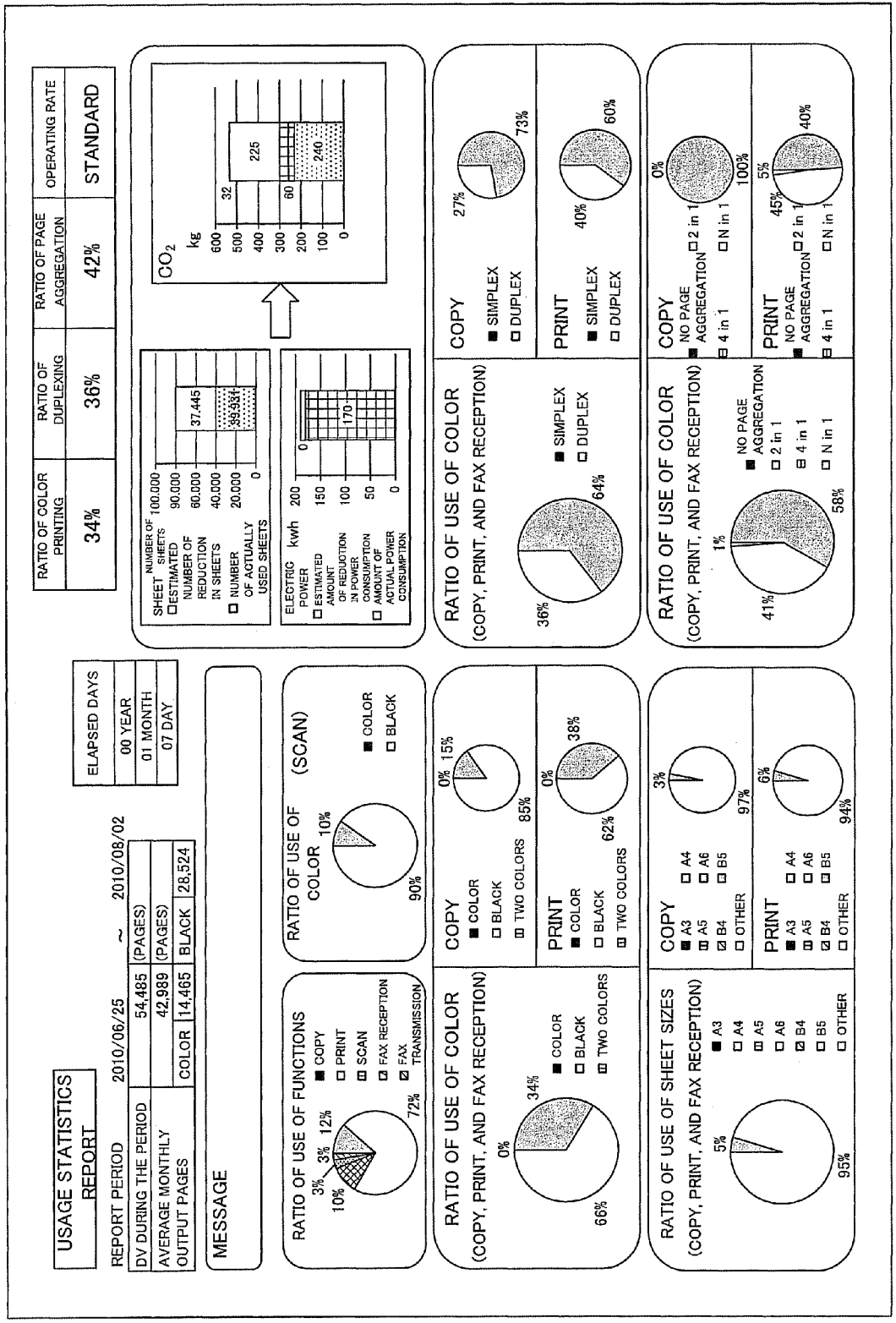
FIG. 12 is a diagram illustrating an example of a details screen.

When the user next presses a "ranking table" button B1, the display section 212 displays the ranks of registered users (not shown). When the user presses a "detail" button B2, the display section 212 displays the details of the statistics of the ECO-MFP 20 shown in FIG. 12. In the example shown in FIG. 12, the details of the statistics of the ECO-MFP 20 itself are displayed, but the statistical values for each user may be displayed.

Figure 13:
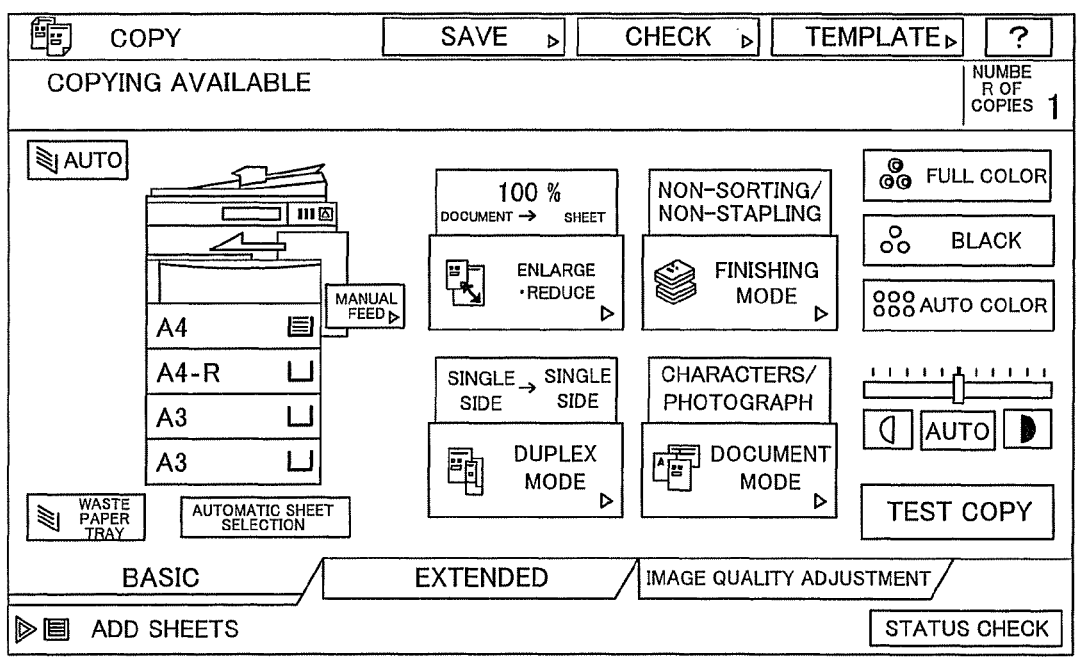
FIG. 13 is a diagram illustrating an example of a normal menu screen.

When the user presses a "close" button B3 in FIG. 11, the display section 212 displays the normal menu screen shown in FIG. 13 (a menu screen for copying in the example in FIG. 13).

Next, examples of screens displayed on the display section 312 of the erasing apparatus 30 are shown in FIGS. 14A to 16B.

Figure 14A:
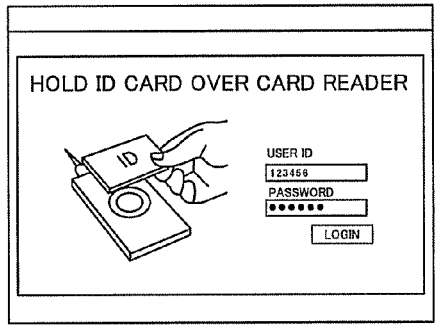
FIG. 14A illustrates an example of a user authentication screen.

The display section 312 first displays an authentication screen (FIG. 14A). The authentication screen is displayed after the erasing apparatus 30 is powered on and initialized. A message urging the user to bring an ID card close to the ID card reader 309 is displayed on the screen, and forms that receive input of the user ID and password are also displayed. The input screen for the user ID and password may be displayed on the display section 212 of the ECO-MFP 20.

Figure 14B:
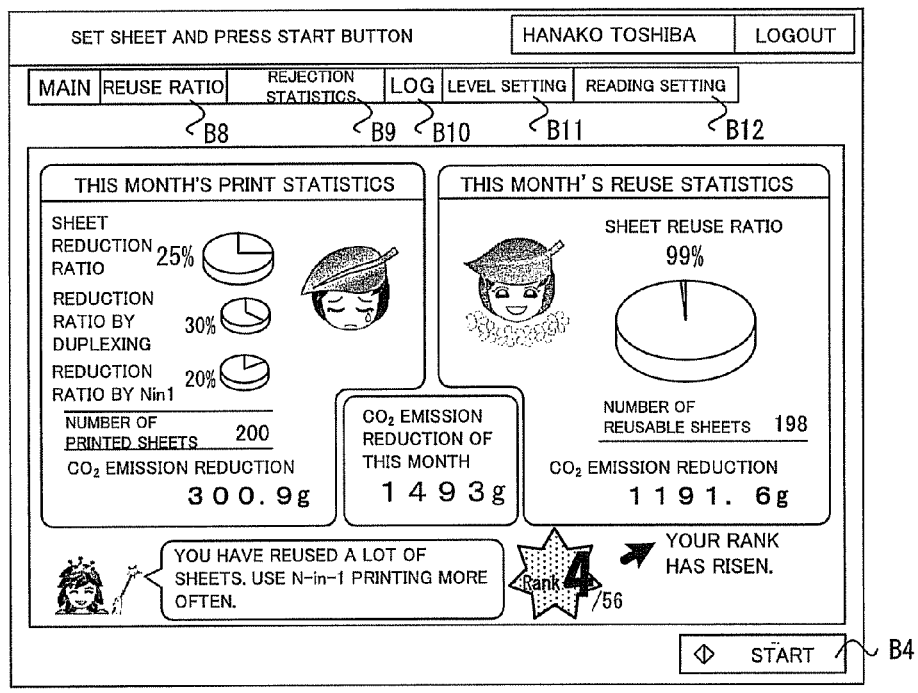
FIG. 14B is a diagram illustrating an exemplary standby screen (analysis report screen) displayed after user authentication.
Figure 14C:
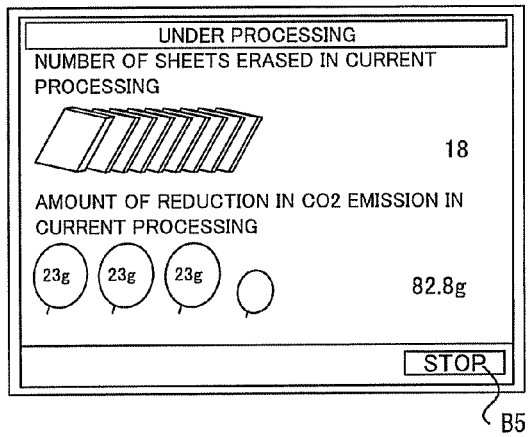
FIG. 14C illustrates an exemplary display during erasing processing.
Figure 14D:
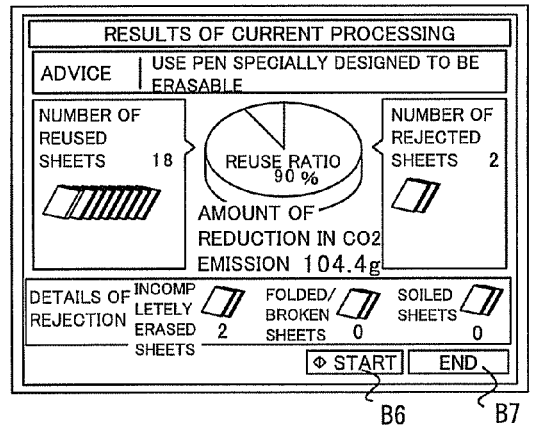
FIG. 14D illustrates an example of the display of erasing processing results.

Upon completion of the user authentication, the display section 312 of the erasing apparatus 30 displays, as a standby screen, a screen including the same contents as those in the analysis report screen shown in FIG. 11 (see FIG. 14B). Since the displayed contents are the same as those in FIG. 11, the detailed description of the screen will be omitted. When a "start" button B4 is pressed, the erasing apparatus 30 starts erasing processing. During the erasing processing, the display section 312 displays in real-time respective values of the number of erased sheets and the amount of a reduction in $CO_2$ emission achieved by the erasure as shown in FIG. 14C. Upon completion of the erasing processing, the display section 312 displays the number of reusable sheets (the number of sheets determined to be reusable by the reusability determining section 308) and the number of rejected sheets (the number of sheets determined to be non-reusable by the reusability determining section 308) and also displays the value of the reuse ratio, the pie chart of the reuse ratio, and the amount of a reduction in $CO_2$ emission achieved by the current processing, as shown in FIG. 14D. The display section 312 also displays the details of rejection (the number of incompletely erased sheets, the number of folded/broken sheets, and the number of soiled sheets) on the lower column. The real time value of the amount of a reduction in $CO_2$ emission shown in FIG. 14C and the values of the reuse ratio and the amount of a reduction in $CO_2$ emission shown inn FIG. 14D may be computed in the erasing apparatus 30, or the computation of these values may be performed in the analysis server 10.

When a "stop" button B5 shown in FIG. 14C is pressed, the screen shown in FIG. 14B appears. When a "start" button B6 in FIG. 14D is pressed, the screen shown in FIG. 14C appears. When an "end" button B7 in FIG. 14D is pressed, the screen shown in FIG. 14B appears.

Next, screens displayed when a "reuse ratio" button B8, a "rejection statistics" button B9, and a "log" button B10 shown in FIG. 14B are pressed are shown in FIGS. 15A to 15C.

When the "reuse ratio" button B8 is pressed, the display section 312 displays the number of reusable sheets, the reuse ratio, the number of rejected sheets, and the rejection ratio for each month in a bar chart (see FIG. 15A). These may be displayed for each user, or the totals in the erasing apparatus 30 may be displayed. The data of the displayed respective values may be acquired by causing the erasing apparatus 30 to send a request to the analysis server 10 or may be compiled and computed by the controller 301 of the erasing apparatus 30.

When the "rejection statistics" button B9 is pressed, the display section 312 displays the details of the rejection statistics in the last one month and advice messages as shown in FIG. 15B. The display section 312 displays the number of incompletely erased sheets, the number of folded/broken sheets, and the number of stained sheets on monthly basis and also displays the advice messages. A plurality of advice messages have been prepared. One or a plurality of threshold values are provided for each type of rejection in advance, and different messages are displayed according to whether or not these numbers exceed any of the threshold values.

When the "log" button B10 is pressed, the display section 312 displays a date and time, the number of processed sheets (the reference number of sheets), the number of reusable sheets, the number of rejected sheets, the reuse ratio, and the amount of a reduction in $CO_2$ emission for each job for erasing processing. The data of the displayed respective values may be acquired by causing the erasing apparatus 30 to send a request to the analysis server 10 or may be computed by the controller 301 of the erasing apparatus 30.

Figure 16A:
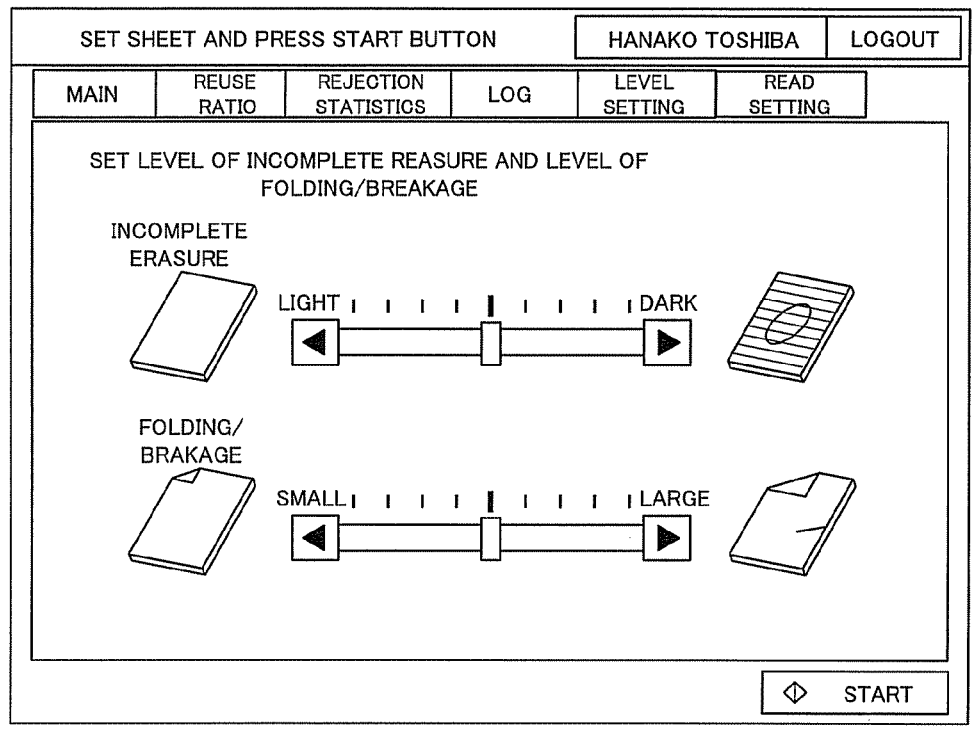
FIG. 16A is a diagram illustrating an exemplary level setting screen of the erasing apparatus.
Figure 16B:
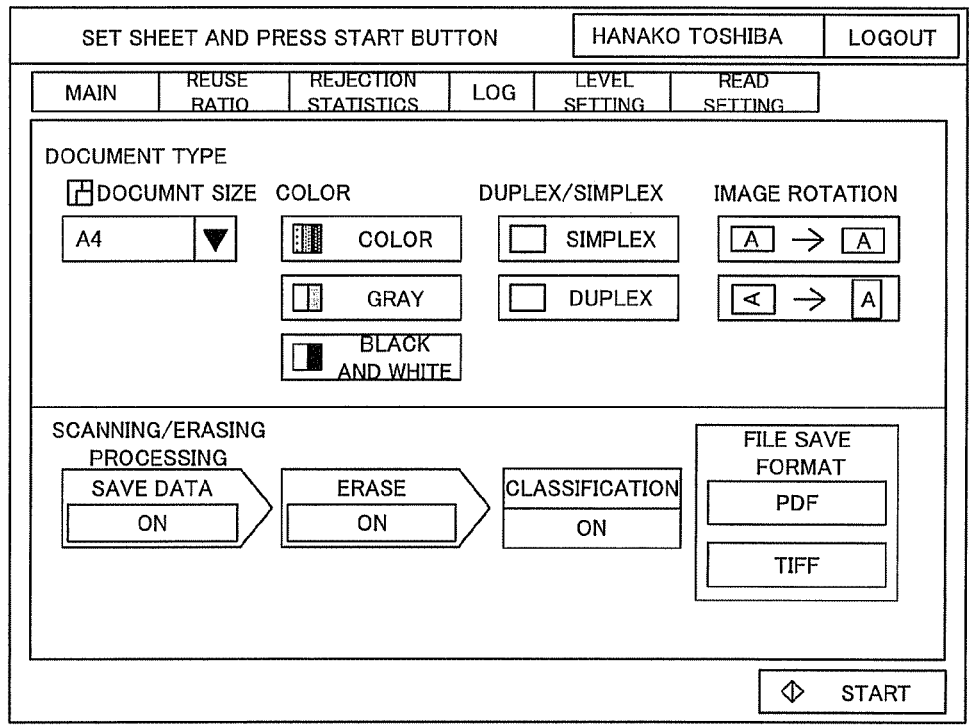
FIG. 16B is a diagram illustrating an exemplary reading setting screen of the erasing apparatus.

FIG. 16A shows an example of a screen that is displayed when a "level setting" button B11 shown in FIG. 14B is pressed and is used to set the level (threshold values) of incomplete erasure and the level of folding/breakage. FIG. 16B is an example of a setting screen displayed when a "reading setting" button B12 shown in FIG. 14B is pressed and is used to read a sheet.

The screen for setting the allowable levels of incomplete erasure and folding/breakage is used to set the acceptable levels of incomplete erasure and folding/breakage, and the threshold values are set by moving slider bars shown in FIG. 16A.

Information about the document size of a sheet to be processed, the color type of toner (color/grayscale/black and white), simplex/duplex printing, the orientation of the document is inputted as the settings for reading (see FIG. 16B). The user can specify, using the screen in FIG. 16B, the setting as to whether or not the image of a document before erasure is saved as image data (SAVE DATA), the setting as to whether or not a toner image is erased (ERASE), and the setting as to whether or not reusable sheets and rejected sheets are classified and stacked in the reusable sheet stacking cassette 304 and the rejected sheet stacking cassette 305, respectively (CLASSIFICATION). When the data is saved, its file format can be specified.

The ECO-MFP 20 may print the contents of the analysis reports shown in the lower part of FIG. 11 and FIGS. 12 and 15A to 15C on sheets. Screens similar to the report display screens in the respective figures may be displayed on the displays of the client terminals 50A to 50N. The reports in the above respective figures may be electronic data in a prescribed format.

In the present embodiment, analysis reports each including the amount of a reduction in $CO_2$ emission and the like are presented to a user immediately after the login of the user, as described using FIGS. 11, 14A, and 14B. If analysis reports are displayed only after a plurality of buttons are operated, the user is required to intentionally open a screen for the analysis reports. Therefore, only a user with high environmental awareness opens the report screen, and a user with low environmental awareness does not open the report screen, so that the user with low environmental awareness does not pay attention to the amount of a reduction in $CO_2$ emission. However, in the present embodiment, the analysis reports are presented to the user before the functions such as copying and printing of the ECO-MFP 20 and the erasing function of the erasing apparatus 30 are used. This forces the user to see the report screen. Therefore, even a user with low environmental awareness is urged to reduce the number of sheets used.

In the present embodiment, the information about the reduction achieved by the ECO-MFP 20 and the information about the reduction achieved by the erasing apparatus 30 are displayed on one screen simultaneously, and the sum of the amounts of the reductions achieved by these apparatuses is also displayed. Therefore, the user can know the reduction amounts over the entire lifecycle of sheets from use and reuse to rejection on one screen in a comprehensive manner.

Second Embodiment

Figure 17:
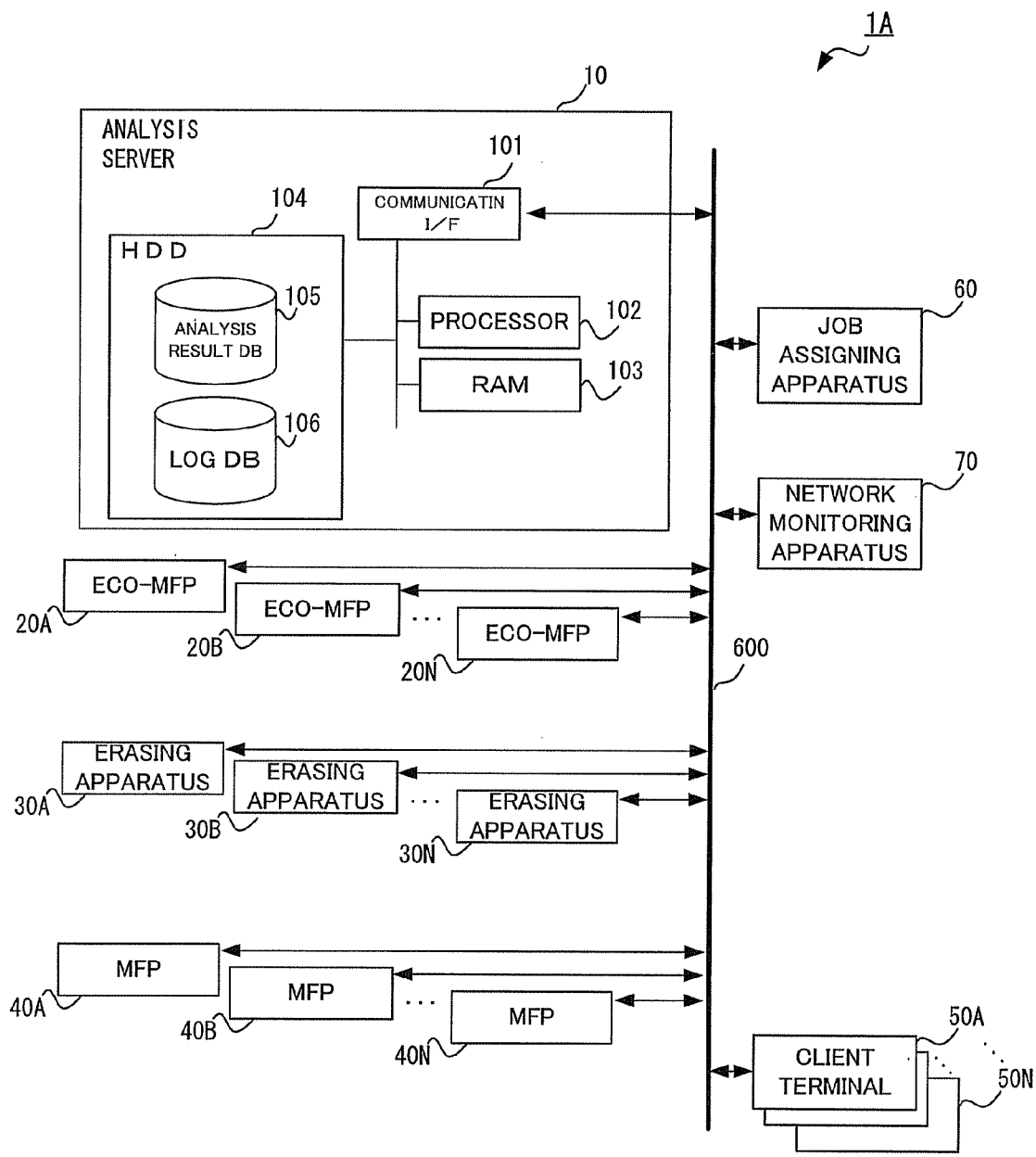
FIG. 17 is a diagram illustrating an exemplary configuration of an image processing system in a second embodiment.

FIG. 17 is a diagram illustrating an exemplary configuration of a system according to a second embodiment. Descriptions of the same components as those described in the first embodiment will be omitted.

The image processing system 1A includes a plurality of ECO-MFPs 20A to 20N, a plurality of erasing apparatuses 30A to 30N, and a plurality of MFPs 40A to 40N and further includes a job assigning apparatus 60 (an authentication unit) and a network monitoring apparatus 70. Each of the ECO-MFPs 20A to 20N is the same as the ECO-MFP 20 described in the first embodiment, and each of the erasing apparatuses 30A to 30N is the same as the erasing apparatus 30 described in the first embodiment.

Each of the MFPs 40A to 40N is an image forming apparatus (MFP), and the hardware configuration thereof is the same as that of the ECO-MFP 20 (see FIG. 1). However, a different type of toner is used in the MFPs 40A to 40N, and printing is performed using a toner that cannot be erased by the erasing apparatuses 30A to 30N. As in the ECO-MFP 20, each of the MFPs 40A to 40N receives input from the user, outputs information about a job for a print or copy operation as an operation log, and stores counter information. The contents of the above information are the same as those used in the ECO-MFP 20 in the first embodiment (see FIGS. 4 and 5A to 5D). As in the ECO-MFP 20 in the first embodiment, the display section of each of the MFPs 40A to 40N displays an authentication screen and then displays analysis reports, upon completion of authentication.

In the second embodiment, print jobs from the client terminals 50A to 50N are transmitted to the job assigning apparatus 60. The job assigning apparatus 60 temporarily receives the print jobs and transmits each of the received print jobs to one of the ECO-MFPs 20A to 20N and the MFPs 40A to 40N. The job assigning apparatus 60 is a computer including a processor, a RAM, an HDD, and a communication I/F. The HDD of the job assigning apparatus 60 stores data for user authentication such as user IDs and passwords and programs in advance. The job assigning apparatus 60 performs user authentication using any of the stored data and programs.

The procedure performed to obtain print output is as follows. The job assigning apparatus 60 receives a print job and a user ID from any of the client terminals 50A to 50N and temporarily stores the job and ID in the own HDD. The user visits one of the ECO-MFPs 20A to 20N and the MFPs 40A to 40N to be used for print output and brings an ID card close to an ID card reader or inputs a user ID and a password. The image forming apparatus that has received the user ID transmits the user ID to the job assigning apparatus 60. The job assigning apparatus 60 performs authentication processing for the transmitted user ID. When the result is affirmative, the job assigning apparatus 60 transmits the print job from the user that has been transmitted from one of the client terminals 50A to 50N to the image forming apparatus that has transmitted the user ID, and print output is thereby performed.

The analysis server 10 in the image processing system 1A can identify the users of the ECO-MFPs 20A to 20N and the MFPs 40A to 40N through user authentication performed by the job assigning apparatus 60 and can therefore transmit an analysis report on the amount of a reduction in environmental burdens for each user. In addition, the analysis server 10 can transmit, in a similar manner, an analysis report on the amount of a reduction in environmental burdens for each user to the erasing apparatuses 30A to 30N each including an authentication receiving section such as an ID card reader and an input receiving section for a user ID and a password.

The network monitoring apparatus 70 sends a request to the ECO-MFPs 20A to 20N, the erasing apparatuses 30A to 30N, and the MFPs 40A to 40N at regular intervals, for example, 10 minute intervals, to acquire their operation logs and counter information and stores the acquired operation logs and counter information in the own storage section. Alternatively, the network monitoring apparatus 70 acquires operation logs and the like transmitted at regular intervals from the respective apparatuses and stores them in the own storage section. The network monitoring apparatus 70 is a computer and includes a processor, a RAM, an HDD, and a communication I/F, as in the analysis server 10.

The analysis server 10 receives the operation logs and counter information from the network monitoring apparatus 70 at regular intervals or in response to a request event from the network monitoring apparatus 70 and stores the received operation logs and counter information in the log DB 106. The analysis server 10 performs processing for analyzing the amount of a reduction in environmental burdens on the basis of the data stored in the log DB 106. The results of the processing are stored in the analysis result DB 105.

Part of or all the functions of the analysis server 10 may be implemented in the network monitoring apparatus 70, and part of or all the functions of the network monitoring apparatus 70 may be implemented in the analysis server 10.

Third Embodiment

Figure 18:
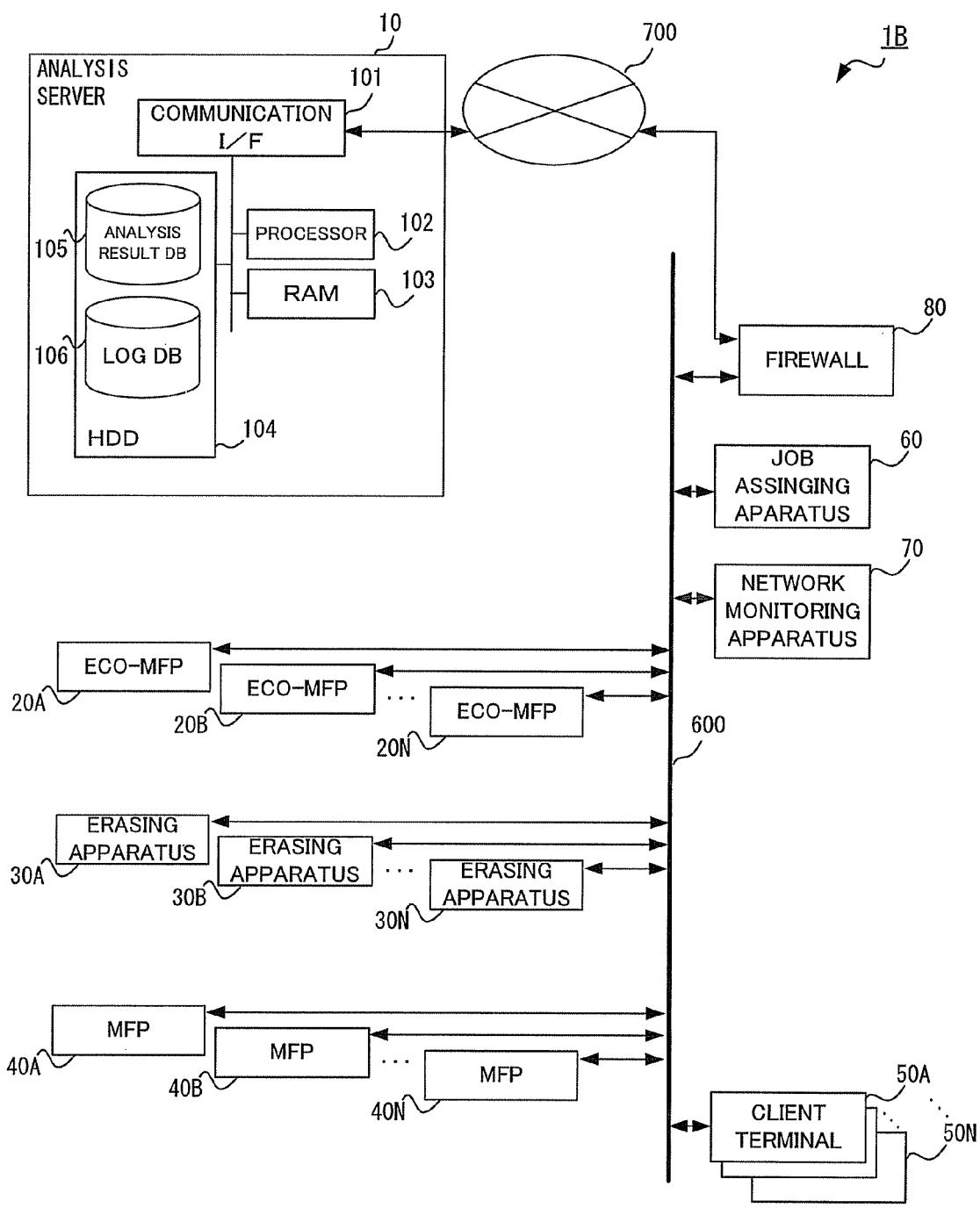
FIG. 18 is a diagram illustrating an exemplary configuration of an image processing system in a third embodiment.

FIG. 18 is a diagram illustrating an exemplary configuration of a system according to a third embodiment. The third embodiment is a modification of the second embodiment, and their basic configurations are the same. Descriptions of components described in the first and second embodiments will be omitted.

The analysis server 10 of the image processing system 1B is connected to the LAN 600 via a WAN 700 (Wide Area Network). A firewall 80 is provided between the WAN 700 and the LAN 600. The firewall 80 monitors the IP address and port number of an apparatus performing transmission/reception and controls the flow of data packets between the WAN 700 and the LAN 600.

When the ECO-MFPs 20A to 20N, the erasing apparatuses 30A to 30N, and the MFPs 40A to 40N can transmit data to the analysis server 10, their operation logs and counter information are transmitted directly. When the ECO-MFPs 20A to 20N, the erasing apparatuses 30A to 30N, and the MFPs 40A to 40N cannot directly communicate with the analysis server 10, they transmit their operation logs and counter information to the network monitoring apparatus 70, and the network monitoring apparatus 70 transmits the received data to the analysis server 10.

The data is transmitted to the analysis server 10 via the WAN 700. Therefore, all the operation logs and counter information may not be transmitted if the bandwidth of the WAN 700 is narrow or if there are security restrictions. In such a case, the network monitoring apparatus 70 may compile the data. Alternatively, the frequency of transmission and reception may be reduced to, for example, once a day or once a week.

In the description of the above embodiments, the amount of a reduction in $CO_2$ emission is used as the amount of a reduction in environmental burdens. In addition to this, index values indicating other environmental problems such as ozone layer destruction and acidification may be used as the amount of a reduction in environmental burdens. In the above embodiments, the amount of a reduction in environmental burdens (the amount of a reduction in $CO_2$ emission) is computed using the number of sheets used, the sheet reduction ratio achieved by the print setting during image formation, the number of reusable sheets, the ratio of reusable sheets, and the like. However, the respective values of the sheet reduction ratio during image formation, the number of reusable sheets formed by the erasing apparatus, and the reuse ratio may be used as the amounts of reductions in environmental burdens.

In the description of the above embodiments, all the ECO-MFP 20 (including the ECO-MFPs 20A to 20N), the erasing apparatus 30 (including the erasing apparatuses 30A to 30N), and the MFPs 40A to 40N display analysis reports. However, only part of the apparatuses such as one of the ECO-MFP 20 and the erasing apparatus 30 may display the analysis reports.

As described above, according to the technique described herein, the amounts of reductions achieved by the image forming apparatus and the erasing apparatus can be displayed. Therefore, more appropriate amounts of reductions in environmental burdens can be presented to users.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image processing system comprising:
    an image forming apparatus configured to form an image on a sheet using a color material that is decolorable by heating;
    an erasing apparatus configured to decolorize and erase, by heating, an image on a sheet outputted from the image forming apparatus;
    a first apparatus configured to compute, from a reduction in the number of sheets that has been achieved by a setting for image formation in the image forming apparatus, an amount of a reduction in environmental burdens that has been achieved by use of the image forming apparatus and to compute, from the number of sheets erased by the erasing apparatus, an amount of a reduction in environmental burdens that has been achieved by use of the erasing apparatus; and
    a display unit configured to simultaneously display the amount of the reduction in environmental burdens that has been achieved by the image forming apparatus and the amount of the reduction in environmental burdens that has been achieved by the erasing apparatus, these amounts having been computed by the first apparatus.

2. The image processing system according to claim 1, wherein
    the first apparatus further computes a sum of the amount of the reduction in environmental burdens that has been achieved by the image forming apparatus and the amount of the reduction in environmental burdens that has been achieved by the erasing apparatus, and
    the display unit further displays the sum simultaneously.

3. The image processing system according to claim 1, wherein the display unit comprises at least one of a display section provided in the image forming apparatus and a display section provided in the erasing apparatus.

4. The image processing system according to claim 1, further comprising an authentication unit configured to perform authentication of a user who operates the image forming apparatus and the erasing apparatus, and wherein the display unit displays an authentication screen and, when the authentication in the authentication unit is affirmative, displays the amounts of the reductions in environmental burdens in place of the authentication screen.

5. The image processing system according to claim 4, wherein the first apparatus computes an amount of a reduction in environmental burdens that has been achieved by use of the image forming apparatus and an amount of a reduction in environmental burdens that has been achieved by use of the erasing apparatus for each of users who use the image processing system, and the display unit displays the amounts of the reductions in environmental burdens for a user who has been authenticated.

6. The image processing system according to claim 1, wherein the amounts of the reductions in environmental burdens are amounts of reductions in carbon dioxide emission.

7. The image processing system according to claim 1, wherein the first apparatus further computes a sheet reduction ratio in the image forming apparatus from the number of sheets used in the image forming apparatus and a reduction in the number of sheets that has been achieved by at least one of a setting for duplex printing in the image forming apparatus and a setting for page aggregation printing in the image forming apparatus, and the display unit further displays the sheet reduction ratio.

8. The image processing system according to claim 1, wherein the first apparatus further computes a sheet reuse ratio from the number of sheets used in the image forming apparatus and the number of sheets erased by the erasing apparatus, and the display unit further displays the sheet reuse ratio.

9. The image processing system according to claim 1, wherein the first apparatus further computes a rank of a user who uses the image processing system from a reduction in the number of sheets that has been achieved by a setting for duplex printing in the image forming apparatus, a reduction in the number of sheets that has been achieved by a setting for page aggregation printing in the image forming apparatus, and the number of sheets erased by the erasing apparatus, and the display unit further displays the rank of the user.

10. The image processing system according to claim 1, wherein the first apparatus selects image data according to a value of each of the amounts of the reductions in environmental burdens, and the display unit further displays the selected image data.

11. An information providing apparatus comprising:

a storage section configured to store display layout data;

a communication section configured to receive first information containing information about a setting for image formation performed by an image forming apparatus that forms an image on a sheet using a color material decolorable by heating and further receive second information containing information about the number of sheets erased by an erasing apparatus that decolorizes and erases, by heating, an image on a sheet outputted from the image forming apparatus, and a controller configured to compute, from a reduction in the number of sheets that is derived from the information which is included in the first information and relates to the setting for image formation, an amount of a reduction in environmental burdens that has been achieved by use of the image forming apparatus, to compute, from the information which is included in the second information and relates to the number of sheets erased, an amount of a reduction in environmental burdens that has been achieved by use of the erasing apparatus, and to generate display data by placing, in the layout data stored in the storage section, the computed amount of the reduction in environmental burdens that has been achieved by the erasing apparatus and the computed amount of the reduction in environmental burdens that has been achieved by the image forming apparatus such that the values of these computed amounts of the reductions in environmental burdens are displayed simultaneously.

12. The information providing apparatus according to claim 11, wherein the controller further computes a sum of the computed amount of the reduction in environmental burdens that has been achieved by the erasing apparatus and the amount of the reduction in environmental burdens that has been achieved by the image forming apparatus and generates the display data such that the sum is further displayed simultaneously.

13. The information providing apparatus according to claim 11, wherein the communication section transmits the generated display data to at least one of the erasing apparatus and the image forming apparatus.

14. The information providing apparatus according to claim 11, wherein the information providing apparatus computes an amount of a reduction in environmental burdens that has been achieved by use of the image forming apparatus and an amount of a reduction in environmental burdens that has been achieved by use of the erasing apparatus for each of users who use the image forming apparatus and the erasing apparatus and generates display data for each of the users.

15. The information providing apparatus according to claim 11, wherein the communication section receives the first information containing the number of sheets used, and the controller further computes a sheet reduction ratio in the image forming apparatus from the number of sheets used in the image forming apparatus and a reduction in the number of sheets that has been achieved by at least one of a setting for duplex printing in the image forming apparatus and a setting for page aggregation printing in the image forming apparatus and generates the display data such that the sheet reduction ratio is further displayed.

16. The information providing apparatus according to claim 11, wherein the communication section receives the first information containing the number of sheets used, and the controller further computes a sheet reuse ratio from the number of sheets used in the image forming apparatus and the number of sheets erased by the erasing apparatus and generates the display data such that the sheet reuse ratio is further displayed.

17. The information providing apparatus according to claim 11, wherein the controller further computes a rank of a user who uses the image forming apparatus and the erasing apparatus from a reduction in the number of sheets that has been achieved by a setting for duplex printing in the image forming apparatus, a reduction in the number of sheets that has been achieved by a setting for page aggregation printing in the image forming apparatus, and the number of sheets erased by the erasing apparatus and generates the display data such that the rank of the user is further displayed.

18. An information providing method comprising:

causing an image forming apparatus to form an image on a sheet using a color material decolorable by heating;

causing an erasing apparatus to decolorize and erase, by heating, the image on the sheet outputted from the image forming apparatus;

causing a first apparatus to compute, from a reduction in the number of sheets that has been achieved by a setting for image formation in the image forming apparatus, an amount of a reduction in environmental burdens that has been achieved by use of the image forming apparatus and to compute, from the number of sheets erased by the erasing apparatus, an amount of a reduction in environmental burdens that has been achieved by use of the erasing apparatus; and displaying simultaneously, on at least one of the image forming apparatus and the erasing apparatus, the amount of the reduction in environmental burdens that has been achieved by the erasing apparatus and the amount of the reduction in environmental burdens that has been achieved by the image forming apparatus, these amounts having been computed by the first apparatus.

19. The information providing method according to claim 18, wherein the first apparatus further computes a sum of the computed amount of the reduction in environmental burdens that has been achieved by the image forming apparatus and the computed amount of the reduction in environmental burdens that has been achieved by the erasing apparatus, and at least one of the image forming apparatus and the erasing apparatus further displays the sum simultaneously.

20. The information providing method according to claim 18, further comprising causing an authentication unit to perform authentication of a user who uses the image forming apparatus and the erasing apparatus, and wherein at least one of the image forming apparatus and the erasing apparatus displays an authentication screen and, when the authentication in the authentication unit is affirmative, displays the amounts of the reductions in environmental burdens in place of the authentication screen.

* * * * *